US012198555B2

(12) United States Patent
Zhang

(10) Patent No.: US 12,198,555 B2
(45) Date of Patent: Jan. 14, 2025

(54) METHOD FOR CONTROLLING VEHICLES DRIVING AS PLATOON AND RELATED DEVICES

(71) Applicant: Tencent Technology (Shenzhen) Company Limited, Shenzhen (CN)

(72) Inventor: Zhuoyun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 194 days.

(21) Appl. No.: 17/982,427

(22) Filed: Nov. 7, 2022

(65) Prior Publication Data

US 2023/0066197 A1 Mar. 2, 2023

Related U.S. Application Data

(63) Continuation of application No. PCT/CN2021/130681, filed on Nov. 15, 2021.

(30) Foreign Application Priority Data

Dec. 15, 2020 (CN) ............................ 202011481594

(51) Int. Cl.
*G08G 1/02* (2006.01)
*G05D 1/02* (2020.01)
*G08G 1/00* (2006.01)

(52) U.S. Cl.
CPC ...................................... *G08G 1/22* (2013.01)

(58) Field of Classification Search
CPC ....... G08G 1/22; G05D 1/0293; G05D 1/0295
See application file for complete search history.

(56) References Cited

U.S. PATENT DOCUMENTS 11,341,856 B2 * 5/2022 Twitty ...................... G05D 1/69
11,427,196 B2 * 8/2022 Switkes ................ G08G 1/166
(Continued)

FOREIGN PATENT DOCUMENTS

CN 108011947 A 5/2018
CN 108845570 A 11/2018
(Continued)

OTHER PUBLICATIONS

Tencent Technology, WO, PCT/CN2021/130681, Dec. 27, 2021, 5 pgs.
(Continued)

*Primary Examiner* — Kira Nguyen
(74) *Attorney, Agent, or Firm* — Morgan, Lewis & Bockius LLP

(57) ABSTRACT

This application provides a method for controlling vehicles driving as a platoon performed by an electronic device. The method includes: transmitting a first vehicle clearing message to a target in-platoon vehicle, and a second vehicle clearing message to following vehicles behind the target in-platoon vehicle, the first vehicle clearing message used for instructing the target in-platoon vehicle to leave the platoon, the second vehicle clearing message used for instructing temporary clearing of the following vehicles behind the target in-platoon vehicle; receiving a platoon joining message returned from the following vehicles behind the target in-platoon vehicle; and reorganizing the following vehicles behind the target in-platoon vehicle according to the platoon joining message to form a new vehicle platoon, the new vehicle platoon not including the target in-platoon vehicle and following vehicles having not transmitted the platoon joining message to the leading vehicle.

20 Claims, 5 Drawing Sheets

(56) References Cited

U.S. PATENT DOCUMENTS

| | | | | |
|---|---|---|---|---|
| 11,981,330 | B2 * | 5/2024 | Eriksson | B60W 30/146 |
| 2015/0100192 | A1 | 4/2015 | Lee et al. | |
| 2019/0220037 | A1 * | 7/2019 | Vladimerou | G05D 1/0293 |
| 2019/0279513 | A1 * | 9/2019 | Schuh | G08G 1/22 |
| 2021/0056854 | A1 * | 2/2021 | Ucar | G05D 1/0295 |
| 2021/0327281 | A1 * | 10/2021 | Mishima | G05D 1/0295 |
| 2022/0139229 | A1 * | 5/2022 | Hong | G08G 1/22 701/26 |
| 2022/0262257 | A1 * | 8/2022 | Franchi | G08G 1/22 |

FOREIGN PATENT DOCUMENTS

| | | | |
|---|---|---|---|
| CN | 111445690 | A | 7/2020 |
| CN | 112416010 | A | 2/2021 |

OTHER PUBLICATIONS

Tencent Technology, Iprp, PCT/CN2021/130681, Jun. 13, 2023, 6 pgs.

Tencent Technology, ISR, PCT/CN2021/130681, Dec. 27, 2021, 2 pgs.

* cited by examiner

METHOD FOR CONTROLLING VEHICLES DRIVING AS PLATOON AND RELATED DEVICES

CROSS-REFERENCE TO RELATED APPLICATIONS

This application is a continuation application of PCT Patent Application No. PCT/CN2021/130681, entitled "METHOD FOR CONTROLLING VEHICLES TO DRIVE AS PLATOON, AND RELATED DEVICE" filed on Nov. 15, 2021, which claims priority to Chinese Patent Application No. 202011481594.4, filed with the State Intellectual Property Office of the People's Republic of China on Dec. 15, 2020, and entitled "METHOD FOR CONTROLLING VEHICLES DRIVING AS PLATOON AND RELATED DEVICES", all of which are incorporated herein by reference in their entirety.

This application relates to U.S. patent application Ser. No. 17/982,424, entitled "METHOD AND APPARATUS FOR CONTROLLING VEHICLE TO DRIVE AS PLATOON, ELECTRONIC DEVICE, AND STORAGE MEDIUM" filed on Nov. 7, 2022, which is incorporated herein by reference in its entirety.

FIELD OF THE TECHNOLOGY

This application relates to the field of computer and communication technologies, and specifically, to controlling of vehicles driving as a platoon.

BACKGROUND OF THE DISCLOSURE

With the development and application of new technologies such as the autonomous driving technology, the information communication technology, and cloud computing, transformation of automobiles from manually controlled mechanical products to intelligent products controlled by intelligent systems speeds up. Traffic accidents caused by fatigue driving of automobile drivers are frequently reported, and applying the automatic driving technology to automobiles can effectively lower the accident rate.

Multi-vehicle platooning is a key direction. If platoon coordination between vehicles is completed, rear-end collision caused by emergency braking of the front vehicle can be effectively avoided, thereby greatly improving road safety; and multi-vehicle platoon automatic driving can shorten the following distance between vehicles and make wind resistance of the rear vehicle smaller, which can reduce the fuel consumption costs of the rear vehicle. However, during actual operation of the vehicle platoon, any vehicle in the vehicle platoon may break down, or need to leave the vehicle platoon. Due to the relatively short distance between vehicles in a vehicle platoon, it is relatively difficult for vehicles in the middle of the vehicle platoon to leave the platoon, which greatly interferes with the normal driving of other vehicles in the vehicle platoon and bring certain safety hazards.

SUMMARY

Embodiments of this application provide a method for controlling vehicles driving as a platoon and related devices, which provides a solution for a case that a non-tail following vehicle in a vehicle platoon needs to leave the platoon when vehicles are driving as a platoon.

An embodiment of this application provides a method for controlling vehicles driving as a platoon in connection with a target vehicle platoon including a leading vehicle and following vehicles, the following vehicles including a tail vehicle and in-platoon vehicles, the in-platoon vehicles including a target in-platoon vehicle about to leave the target vehicle platoon, and the method being applicable to the leading vehicle. The method includes: transmitting, from the leading vehicle, a first vehicle clearing message to the target in-platoon vehicle, and transmitting a second vehicle clearing message to following vehicles in the target vehicle platoon behind the target in-platoon vehicle, the first vehicle clearing message being used for indicating that a status of the target in-platoon vehicle is a free status and instructing the target in-platoon vehicle to leave the target vehicle platoon, the second vehicle clearing message including a temporary clearing indication, the temporary clearing indication being used for instructing temporary clearing of the following vehicles behind the target in-platoon vehicle, and a status of the following vehicles behind the target in-platoon vehicle that receive the second vehicle clearing message being a temporary clearing status; receiving a platoon joining message returned from the following vehicles behind the target in-platoon vehicle in response to receiving the temporary clearing indication; and reorganizing the following vehicles behind the target in-platoon vehicle according to the platoon joining message to form a new vehicle platoon, the new vehicle platoon not including the target in-platoon vehicle and following vehicles behind the target in-platoon vehicle that have not transmitted the platoon joining message to the leading vehicle.

An embodiment of this application provides a method for controlling vehicles driving as a platoon in connection with a target vehicle platoon including a leading vehicle and following vehicles, the following vehicles including a tail vehicle and in-platoon vehicles, the in-platoon vehicles including a target in-platoon vehicle about to leave the target vehicle platoon, and the method being applicable to the target in-platoon vehicle. The method includes: receiving a first vehicle clearing message transmitted by the leading vehicle; setting a status of the target in-platoon vehicle to a free status in response to the first vehicle clearing message; and controlling the target in-platoon vehicle to leave the target vehicle platoon and stop transmitting a heartbeat message to the leading vehicle.

An embodiment of this application provides a method for controlling vehicles driving as a platoon in connection with a target vehicle platoon including a leading vehicle and following vehicles, the following vehicles including a tail vehicle and in-platoon vehicles, the in-platoon vehicles including a target in-platoon vehicle about to leave the target vehicle platoon, and the method being applicable to following vehicles behind the target in-platoon vehicle. The method includes: receiving a second vehicle clearing message transmitted by the leading vehicle, the second vehicle clearing message including a temporary clearing indication, the temporary clearing indication being used for instructing temporary clearing of the following vehicles behind the target in-platoon vehicle; setting a status of the following vehicles behind the target in-platoon vehicle to a temporary clearing status in response to the temporary clearing indication in the second vehicle clearing message; and transmitting a platoon joining message to the leading vehicle according to the temporary clearing indication in the second vehicle clearing message, for the leading vehicle to reorganize the following vehicles behind the target in-platoon vehicle according to the platoon joining message to form a new vehicle platoon, the new vehicle platoon not including the target in-platoon vehicle and following vehicles behind the target in-platoon vehicle that have not transmitted the platoon joining message to the leading vehicle.

An embodiment of this application provides an apparatus for controlling vehicles driving as a platoon in connection with a target vehicle platoon including a leading vehicle and following vehicles, the following vehicles including a tail vehicle and in-platoon vehicles, the in-platoon vehicles including a target in-platoon vehicle about to leave the target vehicle platoon, and the apparatus being applicable to the leading vehicle. The apparatus includes: a vehicle clearing message transmission unit, configured to: transmit a first vehicle clearing message to the target in-platoon vehicle, and transmit a second vehicle clearing message to following vehicles behind the target in-platoon vehicle, the first vehicle clearing message being used for indicating that a status of the target in-platoon vehicle is a free status and instructing the target in-platoon vehicle to leave the target vehicle platoon, the second vehicle clearing message including a temporary clearing indication, the temporary clearing indication being used for instructing temporary clearing of the following vehicles behind the target in-platoon vehicle, and a status of the following vehicles behind the target in-platoon vehicle that receive the second vehicle clearing message being a temporary clearing status; a platoon joining message receiving unit, configured to receive a platoon joining message returned, in response to the temporary clearing indication, from the following vehicles behind the target in-platoon vehicle; and a vehicle platoon reorganization unit, configured to reorganize the following vehicles behind the target in-platoon vehicle according to the platoon joining message to form a new vehicle platoon, the new vehicle platoon not including the target in-platoon vehicle and following vehicles behind the target in-platoon vehicle that have not transmitted the platoon joining message to the leading vehicle.

An embodiment of this application provides an apparatus for controlling vehicles driving as a platoon in connection with a target vehicle platoon including a leading vehicle and following vehicles, the following vehicles including a tail vehicle and in-platoon vehicles, the in-platoon vehicles including a target in-platoon vehicle about to leave the target vehicle platoon, and the apparatus being applicable to the target in-platoon vehicle. The apparatus includes: a first vehicle clearing message receiving unit, configured to receive a first vehicle clearing message transmitted by the leading vehicle; a target in-platoon vehicle status setting unit, configured to set a status of the target in-platoon vehicle to a free status in response to the first vehicle clearing message; and a target in-platoon vehicle leaving unit, configured to control the target in-platoon vehicle to leave the target vehicle platoon and stop transmitting a heartbeat message to the leading vehicle.

An embodiment of this application provides an apparatus for controlling vehicles driving as a platoon in connection with a target vehicle platoon including a leading vehicle and following vehicles, the following vehicles including a tail vehicle and in-platoon vehicles, the in-platoon vehicles including a target in-platoon vehicle about to leave the target vehicle platoon, and the apparatus being applicable to following vehicles behind the target in-platoon vehicle. The apparatus includes: a second vehicle clearing message receiving unit, configured to receive a second vehicle clearing message transmitted by the leading vehicle, the second vehicle clearing message including a temporary clearing indication, the temporary clearing indication being used for instructing temporary clearing of the following vehicles behind the target in-platoon vehicle; a temporary clearing status setting unit, configured to set a status of the following vehicles behind the target in-platoon vehicle to a temporary clearing status in response to the temporary clearing indication in the second vehicle clearing message; and a platoon joining message transmission unit, configured to transmit a platoon joining message to the leading vehicle according to the temporary clearing indication in the second vehicle clearing message, for the leading vehicle to reorganize the following vehicles behind the target in-platoon vehicle according to the platoon joining message to form a new vehicle platoon, the new vehicle platoon not including the target in-platoon vehicle and following vehicles behind the target in-platoon vehicle that have not transmitted the platoon joining message to the leading vehicle.

An embodiment of this application provides a non-transitory computer-readable storage medium, storing one or more computer programs, the computer programs, when executed by a processor of an electronic device, causing the electronic device to implement the method for controlling vehicles driving as a platoon according to the foregoing embodiments.

An embodiment of this application provides an electronic device in connection with a current vehicle platoon including a leading vehicle and following vehicles, the following vehicles comprising a target following vehicle about to drive away from the current vehicle platoon, the target following vehicle being a non-tail vehicle in the current vehicle platoon, the electronic device including: one or more processors; and a storage apparatus, configured to store one or more programs, the one or more programs, when executed by the one or more processors, causing the electronic device to implement the method for controlling vehicles driving as a platoon according to the foregoing embodiments.

According to an aspect of this application, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the method for controlling vehicles driving as a platoon provided in the various implementations described above.

In the technical solutions provided in some embodiments of this application, during platooning driving of a target vehicle platoon, when a target in-platoon vehicle in following vehicles in the target vehicle platoon needs to leave the target vehicle platoon, a leading vehicle in the target vehicle platoon may transmit a first vehicle clearing message to the target in-platoon vehicle and transmit a second vehicle clearing message to following vehicles behind the target in-platoon vehicle, the second vehicle clearing message including a special temporary clearing indication, to inform the following vehicles behind the target in-platoon vehicle of the temporary clearing; and the following vehicles behind the target in-platoon vehicle may set their status to a temporary clearing status in response to the temporary clearing indication. If the following vehicles behind target in-platoon vehicle intend to continue to join the platoon, the following vehicles may return a platoon joining message to the leading vehicle, and the leading vehicle may allow, according to the received platoon joining message returned from the following vehicles behind target in-platoon vehicle, the following vehicles behind the target in-platoon vehicle to re-join the platoon, to form a new vehicle platoon, the new vehicle platoon no longer including the target in-platoon vehicle and following vehicles behind the target in-platoon vehicle that have not transmitted the platoon joining message to the leading vehicle. That is, the embodiments of this application provide a solution for a case that a non-tail following vehicle in a vehicle platoon needs to leave the platoon when vehicles are driving as a platoon. The solution for leaving of the target in-platoon vehicle can minimize the interference to the driving of other vehicles in the vehicle platoon, and is an efficient solution for controlling vehicles driving as a platoon.

DESCRIPTION OF EMBODIMENTS

Some terms used in the embodiments of this application are first explained and described.

Platooning refers to that two or more vehicles follow each other closely and are connected to form a vehicle platoon having similar driving behaviors based on a wireless communication technology and an automatic driving technology.

Driving as a platoon refers to that two or more vehicles drive in the form of a platoon in a specific scenario, and platooning behavior processes such as creating a platoon, clearing a platoon, a vehicle joining a platoon, and a vehicle leaving a platoon are further included.

Leading vehicle (LV) refers to a headmost vehicle during driving as a platoon and is responsible for management work of an entire platoon.

Following vehicle (FV) refers to another following vehicle other than the leading vehicle in the platoon during driving as a platoon.

Platooning management message (PMM) refers to a platooning management message.

The embodiments of this application provide a solution for a case that a non-tail following vehicle in a vehicle platoon needs to leave the platoon when vehicles are driving as a platoon.

Figure 1:
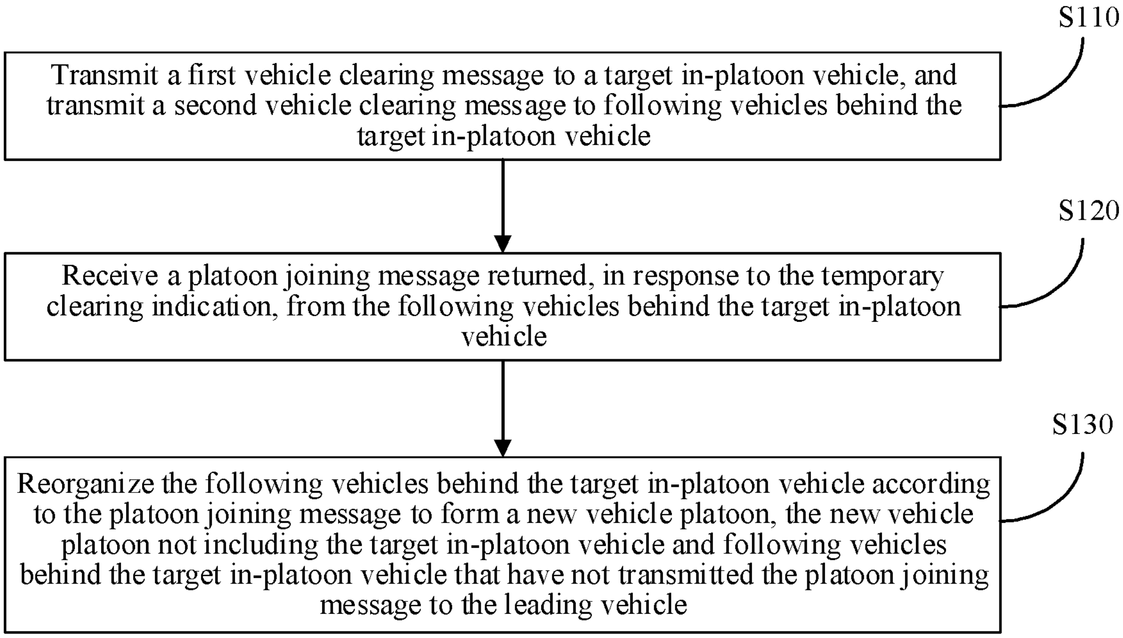
FIG. 1 is a schematic flowchart of a method for controlling vehicles driving as a platoon according to an embodiment of this application.

FIG. 1 is a schematic flowchart of a method for controlling vehicles driving as a platoon according to an embodiment of this application. In the embodiment in FIG. 1, a target vehicle platoon may include a leading vehicle and following vehicles, the following vehicles may include a tail vehicle (the last vehicle in the target vehicle platoon during platooning driving) and in-platoon vehicles (non-tail vehicles), and the in-platoon vehicles include a target in-platoon vehicle about to leave the target vehicle platoon, that is, the target in-platoon vehicle is a non-tail following vehicle that needs to leave the platoon. The method provided in the embodiment in FIG. 1 is applicable to the leading vehicle.

In this embodiment of this application, during platooning driving of vehicles, vehicles (for example, the leading vehicle and any following vehicle or different following vehicles) may perform communication through a wireless communication technology (the wireless communication technology may be a dedicated short range communication (DSRC) technology, cellular vehicle-to-everything (C-V2X, a communication manner based on 4G, 5G, and a future evolved cellular mobile communication technology between a networking vehicle and another "networking" road user, vehicle or infrastructure), or an electronic toll collection (ETC) system, and the wireless communication technology is not limited in this application). The leading vehicle may include a platoon control unit which is responsible for coordinating the leading vehicle and the following vehicles in the target vehicle platoon, to ensure a specific safe distance for driving as a platoon. In addition, all vehicles in the target vehicle platoon include capabilities such as sensing, positioning, planning, controlling, and interaction. The leading vehicle and the following vehicles can be connected to a cloud server through a network to implement interaction. The leading vehicle and the following vehicles report information to the cloud server, and the cloud server implements functions such as vehicle condition monitoring, scheduling, and management. However, this application is not limited thereto.

As shown in FIG. 1, the method provided in this embodiment of this application may include the following steps:

Step S110: Transmit a first vehicle clearing message to a target in-platoon vehicle, and transmit a second vehicle clearing message to following vehicles behind the target in-platoon vehicle.

The first vehicle clearing message is used for indicating that a status of the target in-platoon vehicle is a free status and instructing the target in-platoon vehicle to leave the target vehicle platoon, the second vehicle clearing message may include a temporary clearing indication, the temporary clearing indication is used for instructing temporary clearing of the following vehicles behind the target in-platoon vehicle, and a status of the following vehicles behind the target in-platoon vehicle that receive the second vehicle clearing message is a temporary clearing status.

In this embodiment of this application, a status of a vehicle in the target vehicle platoon may be set to include a "leading status", a "following status", a "free status", and a "temporary clearing status". The leading vehicle is in a leading status, the following vehicles are in a following status, and a vehicle that is not in the vehicles driving as a platoon is in a free status (a corresponding vehicle may be referred to as a free-vehicle or a free vehicle). The temporary clearing status refers to a status that vehicles in the target vehicle platoon are temporarily cleared rather than formally cleared (the status of the following vehicles formally cleared changes to the free status), and may re-join the platoon after a predetermined condition is met (for example, when determining that the target in-platoon vehicle leaves the target vehicle platoon or a time set by a temporary clearing timer is reached, which is not limited in this application).

In this embodiment of this application, vehicles in the target vehicle platoon may be set to include at least four different roles, which may be respectively a "leader", a "free-vehicle", a "follower", a "temporary free-vehicle", and the like. A role of the leading vehicle is set to be a leader, a role of the following vehicle is set to be a follower, a role of a vehicle that has left or does not join the target vehicle platoon is a free-vehicle, and a temporary free-vehicle refers to a role between a free-vehicle and a follower of a vehicle in the target vehicle platoon that is temporarily cleared rather than formally cleared (a role of each following vehicle changes to a free-vehicle after the vehicle is formally cleared) and may re-join the platoon after a predetermined condition is met.

In some embodiments, statuses of vehicles in the target vehicle platoon may be set, or roles of vehicles in the target vehicle platoon may be set. In some other embodiments, statuses and roles of vehicles in the target vehicle platoon may be set simultaneously. For example, a role of the leading vehicle is a leader, and a corresponding status thereof is a leading status; a role of the following vehicle is a follower, and a corresponding status thereof is a following status; and a role of a free vehicle is a free-vehicle, and a corresponding status thereof is a free status. After the following vehicles behind the target in-platoon vehicle receive the vehicle clearing message including the temporary clearing indication, a corresponding role may change from an original follower to a temporary free-vehicle, and a corresponding status may change from an original following status thereof to a temporary clearing status. After the target in-platoon vehicle receives the vehicle clearing message, a corresponding role may change from an original follower to a free-vehicle, and a corresponding status may change from an original following status thereof to a free status.

In an exemplary embodiment, the second vehicle clearing message may include a clearing status field, and a value of the clearing status field represents the temporary clearing indication, where the first vehicle clearing message may not include the clearing status field; or the first vehicle clearing message may include the clearing status field, and the value of the clearing status field represents a non-temporary clearing indication; or the first vehicle clearing message may include the clearing status field, and the value of the clearing status field represents the temporary clearing indication.

For example, the leading vehicle may transmit the first vehicle clearing message and the second vehicle clearing message to the target in-platoon vehicle and the following vehicles behind the target in-platoon vehicle respectively in a unicast manner. A packet corresponding to the second vehicle clearing message may include a clearing status field, and the foregoing temporary clearing indication is represented by setting a value of the clearing status field to, for example, a first value (for example, "1", but this application is not limited thereto). After receiving the second vehicle clearing message, the following vehicles behind the target in-platoon vehicle may know that they are temporarily cleared according to the value of the clearing status field included in the second vehicle clearing message. A packet corresponding to the first vehicle clearing message transmitted to the target in-platoon vehicle may not include the clearing status field, or include the clearing status field but a value corresponding to the clearing status field is set to a second value (for example, "2", but this application is not limited thereto) to represent a non-temporary clearing indication. After receiving the first vehicle clearing message, the target in-platoon vehicle may know that it is not temporarily cleared and may freely leave the target vehicle platoon.

In another example, the leading vehicle may transmit the first vehicle clearing message and the second vehicle clearing message to the target in-platoon vehicle and the following vehicles behind the target in-platoon vehicle respectively in a broadcast manner (in this case, contents of the two messages are the same, and the two messages may be collectively referred to as vehicle clearing messages). Packets corresponding to the vehicle clearing messages transmitted to the following vehicles behind the target in-platoon vehicle and the target in-platoon vehicle may each include a clearing status field, and a value of each clearing status field is set to, for example, a first value (for example, "1", but this application is not limited thereto) to represent the temporary clearing indication. After receiving the vehicle clearing message, the following vehicles behind the target in-platoon vehicle may know that they are temporarily cleared according to the value of the clearing status field included in the vehicle clearing message; and the target in-platoon vehicle may also know that it is temporary clearing, but the target in-platoon vehicle may choose to ignore the temporary clearing indication and choose to leave the target vehicle platoon.

In an exemplary embodiment, the first vehicle clearing message and the second vehicle clearing message may include a leaving list and a temporary leaving list, the leaving list includes identity information of the target in-platoon vehicle, the temporary leaving list includes identity information of the following vehicles behind the target in-platoon vehicle, and the temporary leaving list is used as the temporary clearing indication.

In an exemplary embodiment, the leading vehicle may alternatively transmit a vehicle clearing message to all the following vehicles in the target vehicle platoon in a broadcast manner (in this case, the contents of the first vehicle clearing message and the second vehicle clearing message are the same, which may be collectively referred to as a vehicle clearing message). The vehicle clearing message includes both a leaving list (leavinglist) and a temporary leaving list, identity information of the target in-platoon vehicle, for example, a vehicle identifier (ID), is put into the leaving list, and identity information of the following vehicles behind the target in-platoon vehicle, for example, a vehicle ID, is put into the temporary leaving list. In this way, after the following vehicles in front of the target in-platoon vehicle receive the vehicle clearing message, it is found through detection that their identity information is neither in the leaving list nor in the temporary leaving list, then the following vehicles in front of the target in-platoon vehicle shall ignore the vehicle clearing message. After receiving the vehicle clearing message, the target in-platoon vehicle finds that its own vehicle ID is in the leaving list, then it knows that it is formally cleared. After receiving the vehicle clearing message, the following vehicles behind the target in-platoon vehicle find that their vehicle IDs are in the temporary leaving list, and then know that they are temporarily cleared.

In this embodiment of this application, that the leading vehicle transmits the first vehicle clearing message and the second vehicle clearing message to the target in-platoon vehicle and the following vehicles behind the target in-platoon vehicle respectively may include the following two cases: one is that the target in-platoon vehicle applies for leaving the platoon, and the trigger condition may be that the platooning policy of the target vehicle platoon changes, or the target in-platoon vehicle breaks down, or the driving policy of the target in-platoon vehicle changes; the other is that the leading vehicle actively clears the target in-platoon vehicle, and the trigger condition may be that the platooning policy of the target vehicle platoon changes or the leading vehicle finds that the target in-platoon vehicle is not suitable to continue to drive in the target vehicle platoon.

In an exemplary embodiment, before the transmitting a first vehicle clearing message to a target in-platoon vehicle, and transmitting a second vehicle clearing message to following vehicles behind the target in-platoon vehicle, the method may further include: receiving a leaving application message transmitted by the target in-platoon vehicle. The transmitting a first vehicle clearing message to a target in-platoon vehicle, and transmitting a second vehicle clearing message to following vehicles behind the target in-platoon vehicle may include: in response to the leaving application message, transmitting, by the leading vehicle, the first vehicle clearing message to the target in-platoon vehicle, and transmitting the second vehicle clearing message to the following vehicles behind the target in-platoon vehicle.

In an exemplary embodiment, the leaving application message carries the identity information of the target in-platoon vehicle. The in response to the leaving application message, transmitting the first vehicle clearing message to the target in-platoon vehicle, and transmitting the second vehicle clearing message to the following vehicles behind the target in-platoon vehicle may include: acquiring platoon information of the target vehicle platoon according to the identity information of the target in-platoon vehicle carried in the leaving application message; and when it is determined according to the platoon information of the target vehicle platoon that the target in-platoon vehicle is not the tail vehicle and in response to the leaving application message, transmitting the first vehicle clearing message to the target in-platoon vehicle, and transmitting the second vehicle clearing message to the following vehicles behind the target in-platoon vehicle. After the in response to the leaving application message, transmitting the first vehicle clearing message to the target in-platoon vehicle, and transmitting the second vehicle clearing message to the following vehicles behind the target in-platoon vehicle, the method may further include: putting the identity information (such as a license plate number and an allocated vehicle ID) of the target in-platoon vehicle into a leaving list, for the status of the target in-platoon vehicle to be set to the free status; and setting, by the leading vehicle, the status of the following vehicles behind the target in-platoon vehicle to the temporary clearing status.

In a possible implementation, because the driving policy of the target in-platoon vehicle changes, for example, the target in-platoon vehicle needs to leave the target vehicle platoon and enters a gas station, the target in-platoon vehicle may transmit a leaving application message to the leading vehicle, and the leaving application message may include the identity information of the target in-platoon vehicle, such as any one or more of a license plate number of the target in-platoon vehicle or a vehicle ID allocated to the target in-platoon vehicle in the target vehicle platoon, provided that the target in-platoon vehicle can be uniquely identified in the target vehicle platoon. After receiving the leaving application message, the leading vehicle may obtain platoon information of the entire target vehicle platoon according to the identity information of the target in-platoon vehicle carried in the leaving application message. The platoon information of the target vehicle platoon may include related information between each vehicle and another different vehicle in the target vehicle platoon, for example, a current position of each vehicle or whether the vehicle is a tail vehicle, and if the vehicle is an in-platoon vehicle, a position of the vehicle in the platoon may be also provided. Therefore, the leading vehicle may determine that the target in-platoon vehicle transmitting the leaving application message is not a tail vehicle, so that the leading vehicle is triggered and transmits the first vehicle clearing message to the target in-platoon vehicle in the target vehicle platoon and transmits the second vehicle clearing message to the following vehicles behind the target in-platoon vehicle, and a special temporary clearing indication is included in the second vehicle clearing message, the temporary clearing indication indicating that the following vehicles behind the target in-platoon vehicle may re-join the platoon after being temporarily cleared.

Figure 2:
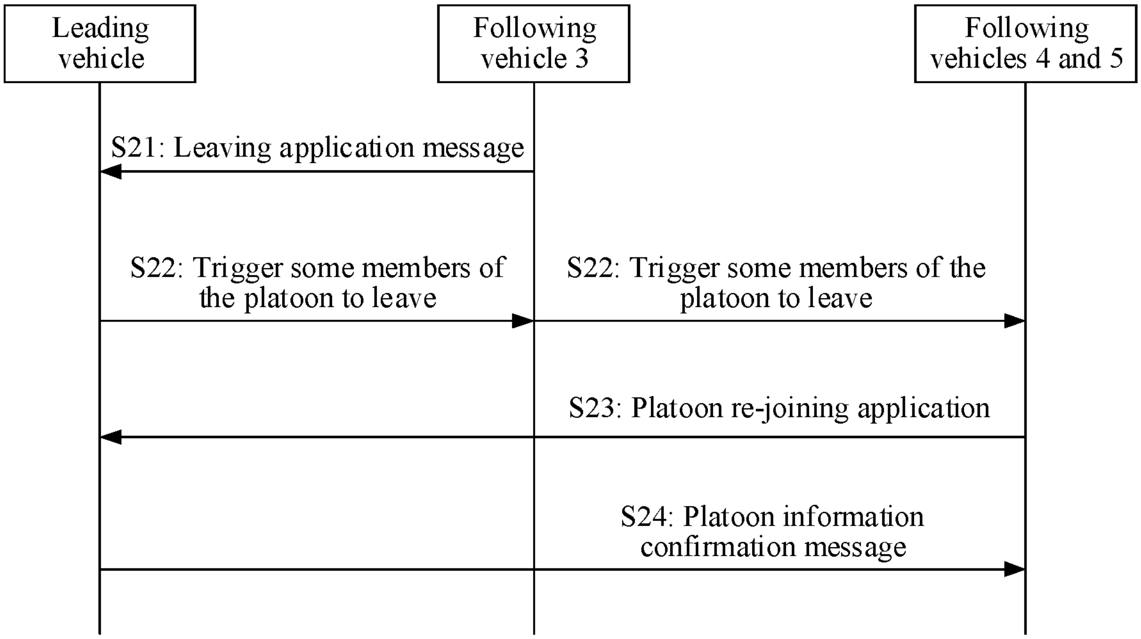
FIG. 2 is a schematic diagram of a method for controlling vehicles driving as a platoon according to an embodiment of this application.

If the target in-platoon vehicle applies to leave the platoon, for a specific interaction process between the target in-platoon vehicle and the leading vehicle, reference may be made to FIG. 2.

In an exemplary embodiment, the transmitting a first vehicle clearing message to a target in-platoon vehicle, and transmitting a second vehicle clearing message to following vehicles behind the target in-platoon vehicle may include: when detecting an abnormal behavior of the target in-platoon vehicle or in response to an adjustment instruction for adjusting the target vehicle platoon, transmitting the first vehicle clearing message to the target in-platoon vehicle, and transmitting the second vehicle clearing message to the following vehicles behind the target in-platoon vehicle.

In this embodiment of this application, a trigger condition for the leading vehicle to clear the target in-platoon vehicle may be that the leading vehicle finds that the target in-platoon vehicle is abnormal (which may be that the target in-platoon vehicle reports a special event to the leading vehicle or the cloud server or the leading vehicle actively notices the abnormality) or may be a platoon management requirement change of the target vehicle platoon, and an adjustment instruction is to adjust the platooning policy of the target vehicle platoon such as clear the target in-platoon vehicle in the target vehicle platoon. The adjustment instruction may be decided and transmitted by the leading vehicle or may be received from outside, for example, the cloud server, which is not limited in this application. For a specific interaction process that the leading vehicle actively clears the target in-platoon vehicle, reference may be made to FIG. 3.

In this embodiment of this application, the temporary clearing indication in the second vehicle clearing message transmitted by the leading vehicle to the following vehicles behind the target in-platoon vehicle is equivalent to including a platoon re-joining invitation to the following vehicles behind the target in-platoon vehicle. The platoon re-joining invitation may include platoon information of the target vehicle platoon (except for the foregoing target in-platoon vehicle). It may be understood that, in terms of safety and privacy protection, or in terms of saving message transmission, the platoon information transmitted by the leading vehicle to the following vehicles behind the target in-platoon vehicle may be simplified when compared with the platoon information saved in the leading vehicle. For example, the platoon information transmitted to each following vehicle behind the target in-platoon vehicle may include only related information about the following vehicle behind the target in-platoon vehicle and two adjacent following vehicles in front of and behind the following vehicle.

In an exemplary embodiment, the temporary clearing indication may include a temporary clearing timer (which is recorded as T1 below, but this application is not limited thereto).

After the transmitting a second vehicle clearing message to following vehicles behind the target in-platoon vehicle, the method may further include: maintaining, in the leading vehicle before a time specified by the temporary clearing timer, platoon information of the following vehicles behind the target in-platoon vehicle in the target vehicle platoon.

After the leading vehicle transmits the first vehicle clearing message to the target in-platoon vehicle and transmits the second vehicle clearing message to the following vehicles behind the target in-platoon vehicle, within a time specified by the temporary clearing timer T1, the leading vehicle does not clear the platoon information of the following vehicles behind the target in-platoon vehicle in the target vehicle platoon (the platoon information of the following vehicles in front of the target in-platoon vehicle is certainly saved). In other embodiments, the platoon information of the target in-platoon vehicle may even continue to be saved in the leading vehicle, and only the vehicle ID of the target in-platoon vehicle is put into the leaving list.

In this embodiment of this application, the platoon information may include member management information, basic information basicInfo, identity information identityInfo, path information pathInfo, and vehicle ability information vehAbilityInfo.

The member management information may further include a role and a status (for example, statuses such as applying for joining the platoon and applying for leaving the platoon may be included) of each vehicle in the target vehicle platoon, and information about adjacent vehicles in front of and behind each vehicle. The basic information, the identity information, and the vehicle ability information may further include whether each vehicle in the target vehicle platoon has a driver (whether each vehicle is automatically driven) a communication manner adopted by each vehicle, and whether privacy protection is required, and may further include various information such as a brand, a model, a vehicle length, a load capacity, a color, engine power, and the quantity of axes of each vehicle. The path information may include information such as a destination and a driving path of each vehicle in the target vehicle platoon.

In this embodiment of this application, by maintaining the platoon information of the following vehicles behind the target in-platoon vehicle in the target vehicle platoon in the leading vehicle before the time specified by the temporary clearing timer, when the following vehicles behind the target in-platoon vehicle re-join the platoon subsequently, the following vehicles do not need to transmit the information to the leading vehicle again and only need to simply transmit the platoon joining message, and the leading vehicle also does not need to store and authenticate the information again. Therefore, a platoon re-joining process of the following vehicles behind the target in-platoon vehicle in the temporary clearing status can be greatly simplified.

In this embodiment of this application, after the time T1 specified by the temporary clearing timer, if the leading vehicle does not receive the platoon joining message of one following vehicle behind the target in-platoon vehicle, platoon information of the following vehicle behind the target in-platoon vehicle in the target vehicle platoon may continue to be saved in the leading vehicle for a while, and it is not required to immediately clear the platoon information of the following vehicle behind the target in-platoon vehicle after T1 is reached, provided that the platoon information continues to be saved within T1.

Step S120: Receive a platoon joining message returned, in response to the temporary clearing indication, from the following vehicles behind the target in-platoon vehicle.

In an exemplary embodiment, the method provided in this embodiment of this application may further include: when no platoon joining message returned by a target following vehicle in the following vehicles behind the target in-platoon vehicle has been received within a time specified by the temporary clearing timer, putting identity information of the target following vehicle into a leaving list, and setting a status of the target following vehicle to the free status.

When the temporary clearing indication further includes a temporary clearing timer T1, the following vehicles behind the target in-platoon vehicle are temporarily cleared within a time specified by the temporary clearing timer T1. After each following vehicle behind the target in-platoon vehicle receives the second vehicle clearing message, if the following vehicle intends to continue to join the platoon for driving, the following vehicle returns a platoon joining message to the leading vehicle, indicating that the following vehicle behind the target in-platoon vehicle agrees to continue to join the platoon for driving. When the temporary clearing timer T1 expires and a target following vehicle does not transmit the platoon joining message to the leading vehicle, the leading vehicle will consider that the target following vehicle refuses will not re-join the platoon and the target following vehicle formally leaves the platoon, so that the leading vehicle changes the target following vehicle from the temporary clearing status to a free status, and a role thereof may also change from a temporary free-vehicle to a free-vehicle.

In an exemplary embodiment, the method provided in this embodiment of this application may further include: receiving, by the leading vehicle, a joining application message of the target following vehicle, the joining application message carrying basic information, path information, identity information, and ability information of the target following vehicle; determining, by the leading vehicle, whether the target following vehicle meets an entering permission condition according to the basic information, the path information, the identity information, and the ability information of the target following vehicle carried in the joining application message; and transmitting, by the leading vehicle if it is determined that the target following vehicle meets the entering permission condition, a joining instruction message to the target following vehicle, so that the target following vehicle responds to the joining instruction message and joins a new vehicle platoon, the new vehicle platoon not including the target in-platoon vehicle and following vehicles behind the target in-platoon vehicle that have not transmitted the platoon joining message to the leading vehicle.

In this embodiment of this application, interaction processes that the target in-platoon vehicle whose role has changed to a free-vehicle and the target following vehicle apply for joining to the leading vehicle may be described through the following examples, and a joining process of a free-vehicle is not limited in this application:

First, a privacy protection mode of the free-vehicle is to be consistent with a privacy protection mode of the leader, and the joining process cannot be continued if the privacy protection modes are inconsistent.

If privacy protection in a PMM_PlatooningAnnouncement message of the leader is set to be enabled, the following steps may be included:

(1.1) The free-vehicle transmits an encrypted PMM_JoiningRequest message (privacy protection privacyPro may not be filled) to the leader, and an encryption key is a public key carried in a certificate of the leader. A certificate transmitted by the free-vehicle needs to carry a public key used for encryption.

(1.2) The leading vehicle determines whether the free-vehicle meets an entering permission condition according to basic information (basicInfor), path information (pathInfor), identity information (identityInfor), ability information (vehAbilityInfor) carried in the PMM_JoiningRequest message of the free-vehicle, and performs (1.3) if yes, otherwise performs (1.4).

(1.3) The leader transmits an encrypted RMM_JoiningCommand message to the free-vehicle, and an encryption key is the public key carried in the certificate transmitted by the free-vehicle. A joining list joininglist stores a vehicle temporary ID in a basic safety message (BSM) of the free-vehicle, a member list memberlist stores a set of IDs allocated by the leading vehicle for the leading vehicle, an adjacent front vehicle (an adjacent front following vehicle behind the target in-platoon vehicle of a current following vehicle behind the target in-platoon vehicle), and a current vehicle (the current following vehicle behind the target in-platoon vehicle). The set includes in-platoon serial numbers and an ID list (a value of the list ranges from 1 to n, n is a positive integer greater than 1, and a format of the list is {serial number 1, ID set 1 serial number 2, ID set 2 serial number 3, ID set 3}).

(1.4) The leader transmits a PMM_JoiningCommand message that does not need to be encrypted to the free-vehicle, and a refuse response field carried in the message is set to 0 to represent that a current refuse reason is a process that the leader is processing member changes or that the entering permission condition is not met.

If the privacy protection in the PMM_PlatooningAnnouncement message of the leader is set to 0, the interaction process does not need to be encrypted, and specific content is as follows:

(2.1) The free-vehicle transmits a PMM_JoiningRequest message to the leader.

(2.2) The leading vehicle determines whether the free-vehicle meets an entering permission condition according to basic information (basicInfor), path information (pathInfor), identity information (identityInfor), ability information (vehAbilityInfor) carried in the PMM_JoiningRequest message of the free-vehicle, and performs (2.3) if yes, otherwise performs (2.4).

(2.3) The leader transmits a PMM_JoiningCommand message to the free-vehicle, where a joining list joininglist stores a vehicle temporary ID in a BSM of the free-vehicle, a member list memberlist stores a set of IDs of the leader, an adjacent front vehicle, and a current vehicle, and the set includes in-platoon serial numbers and allocated vehicle temporary IDs, which may remain unchanged (a format may be {serial number 1, ID1 serial number 2, ID2}).

(2.4) The leader transmits a PMM_JoiningCommand message to the free-vehicle, and a refuse response field carried in the message is set to 0 to represent that a current refuse reason is a process that the leader is processing member changes or that the entering permission condition is not met.

In the foregoing steps (1.4) and (2.4), the free-vehicle starts to synchronously transmit a high-frequency heartbeat message, and a temporary ID is an allocated vehicle temporary ID.

Step S130: Reorganize the following vehicles behind the target in-platoon vehicle according to the platoon joining message to form a new vehicle platoon, the new vehicle platoon not including the target in-platoon vehicle and following vehicles behind the target in-platoon vehicle that have not transmitted the platoon joining message to the leading vehicle.

In an exemplary embodiment, the reorganizing the following vehicles behind the target in-platoon vehicle according to the platoon joining message to form a new vehicle platoon may include: reorganizing platoon information according to the platoon joining message; and transmitting the reorganized platoon information to the following vehicles behind the target in-platoon vehicle that have returned the platoon joining message, to form the new vehicle platoon.

The leading vehicle reorganizes the platoon information according to the received platoon joining message returned by the following vehicles behind the target in-platoon vehicle, and transmits finally confirmed platoon information to the following vehicles behind the target in-platoon vehicle that have returned the platoon joining message.

The leading vehicle may transmit the reorganized platoon information to following vehicles in front of the target in-platoon vehicle and the following vehicles behind the target in-platoon vehicle simultaneously in a broadcast manner.

According to the method for controlling vehicles driving as a platoon provided in implementations of this application, during platooning driving of a target vehicle platoon, when a target in-platoon vehicle in following vehicles in the target vehicle platoon needs to leave the target vehicle platoon, a leading vehicle in the target vehicle platoon may transmit a first vehicle clearing message to the target in-platoon vehicle and transmit a second vehicle clearing message to following vehicles behind the target in-platoon vehicle, the second vehicle clearing message including a special temporary clearing indication, to inform the following vehicles behind the target in-platoon vehicle of the temporary clearing; and the following vehicles behind the target in-platoon vehicle may set their status to a temporary clearing status in response to the temporary clearing indication. If the following vehicles behind target in-platoon vehicle intend to continue to join the platoon, the following vehicles may return a platoon joining message to the leading vehicle, and the leading vehicle may allow, according to the received platoon joining message returned from the following vehicles behind target in-platoon vehicle, the following vehicles behind the target in-platoon vehicle to re-join the platoon, to form a new vehicle platoon, the new vehicle platoon no longer including the target in-platoon vehicle and following vehicles behind the target in-platoon vehicle that have not transmitted the platoon joining message to the leading vehicle. That is, the embodiments of this application provide a solution for a case that a non-tail following vehicle in a vehicle platoon needs to leave the platoon when vehicles are driving as a platoon. The solution for leaving of the target in-platoon vehicle can minimize the interference to the driving of other vehicles in the vehicle platoon, and is an efficient solution for controlling vehicles driving as a platoon.

FIG. 2 is a schematic diagram of a method for controlling vehicles driving as a platoon according to an embodiment of this application.

Figure 3:
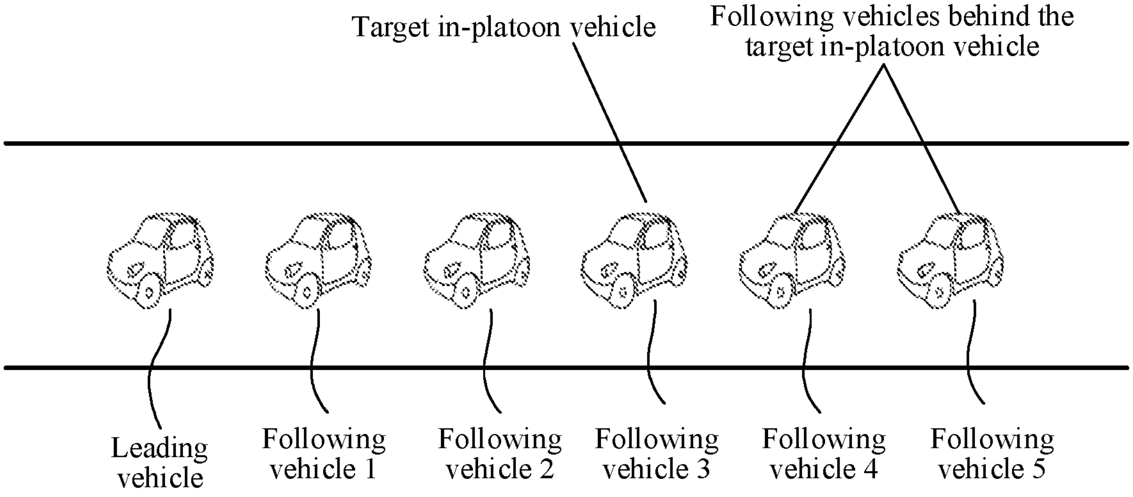
FIG. 3 is a schematic diagram of a method for controlling vehicles driving as a platoon according to another embodiment of this application.

First, as shown in FIG. 3, it is assumed that a member list inside a target vehicle platoon is as follows: a leading vehicle, a following vehicle 1, a following vehicle 2, a following vehicle 3, a following vehicle 4, and a following vehicle 5, where the leading vehicle is the first vehicle in the platoon corresponding to the target vehicle platoon, and the other five following vehicles are arranged and driven in the order in which they are in the platoon. It is assumed that the following vehicle 3 is a target in-platoon vehicle that needs to leave the target vehicle platoon, and the process of actively applying for leaving the platoon of the following vehicle 3 may include the following steps.

Step S21: The following vehicle 3 transmits a leaving application message to the leading vehicle.

when the following vehicle 3 that is a non-tail vehicle needs to leave the target vehicle platoon for driving, for example, the target in-platoon vehicle breaks down, or the target in-platoon vehicle needs to enter a service area, or the target in-platoon vehicle changes a driving path, the target in-platoon vehicle may transmit a leaving application message to the leading vehicle. The leaving application message may be based on a PMM message, and in the PMM message, a status is set to Askforleaving (request to leave or apply to leave), and identity information of the target in-platoon vehicle may be further included.

Step S22: The leading vehicle triggers the following vehicle 3 and some members, namely, the following vehicle 4 and the following vehicle 5 behind the following vehicle 3 to leave the platoon.

In this embodiment of this application, after receiving the leaving application message transmitted by the following vehicle 3, the leading vehicle obtains platoon information of the target vehicle platoon based on identity information of the following vehicle 3 in the leaving application message. According to the platoon information, it can be determined that the following vehicle 3 is a non-tail following vehicle, and the leading vehicle transmits a first vehicle clearing message to the following vehicle 3, and transmits a second vehicle clearing message to the following vehicle 4 and the following vehicle 5 behind the following vehicle 3. Specifically, both the first vehicle clearing message and the second vehicle clearing message may be PMM messages, and a leaving list in the PMM message may include the identity information of the following vehicle 3 that initiates the leaving application. The second vehicle clearing message transmitted to the following vehicle 4 and the following vehicle 5 behind the following vehicle 3 includes a special temporary clearing indication, indicating that this clearing is temporary clearing, and all following vehicles behind the following vehicle 3 in the target vehicle platoon other than the following vehicle 3 may directly transmit a platoon joining message subsequently to apply for joining the target vehicle platoon, which is equivalent to that a platoon joining invitation to the following vehicle 4 and the following vehicle 5 is included in the current vehicle clearing message.

The temporary clearing indication may alternatively be transmitted in the form of a reason value of the vehicle clearing, and the specific implementation of the temporary clearing indication is not limited, where the main objective is to indicate that the following vehicles behind the target in-platoon vehicle in the target vehicle platoon that are left this time may apply to join the platoon again and will re-join the platoon.

Both the first vehicle clearing message and the second vehicle clearing message may include a clearing status field, which may be set separately for each following vehicle in the leaving list, for example, setting clearing status fields of following vehicle 4 and following vehicle 5 to the temporary clearing indication, to indicate temporary clearing of the following vehicle 4 and the following vehicle 5, and setting a clearing status field of the following vehicle 3 to a non-temporary clearing indication or default to indicate non-temporary clearing of the following vehicle 3.

In a possible implementation, the leading vehicle may add an ID of a left vehicle (which is a vehicle ID of the target in-platoon vehicle herein) to a leaving list leavinglist, and transmit a PMM (leadingExt: the leavinglist includes the identity information of the following vehicle 3) message to the target in-platoon vehicle and the following vehicles behind the target in-platoon vehicle as the first vehicle clearing message and the second vehicle clearing message. After receiving the first vehicle clearing message, the target in-platoon vehicle adjusts the status thereof to a free status, sets a role thereof to a free-vehicle, leaves the platoon, transmits a PMM (Status=leaving) message to the leading vehicle, and stops transmitting a high-frequency heartbeat message to the leading vehicle. The leading vehicle shall clear the information of the following vehicle 3 in the leavinglist in response to the (Status=leaving) message.

Step S23: The following vehicle 4 and the following vehicle 5 behind the following vehicle 3 transmit a platoon joining message to the leading vehicle, that is, transmit a platoon re-joining application.

In this embodiment of this application, the temporary clearing indication may include a temporary clearing timer T1. If the following vehicle 4 and the following vehicle 5 behind the following vehicle 3 intend to continue to join the platoon for driving, they will transmit the platoon joining message to the leading vehicle within a time specified by the temporary clearing timer T1, indicating that the following vehicles behind the target in-platoon vehicle intend to continue to join the platoon for driving. If T1 times out and the leading vehicle has not received the platoon joining message transmitted by the following vehicle 4 and the following vehicle 5 behind the target in-platoon vehicle, the following vehicle 4 and the following vehicle 5 formally leave the platoon, and platoon information of the target vehicle platoon saved in the following vehicle 4 and the following vehicle 5 is cleared after T1 times out.

For example, the leading vehicle may transmit a packet including the second vehicle clearing message to the following vehicle 4 and the following vehicle 5 behind the following vehicle 3, the packet including a clearing status field and a temporary clearing timer; after the following vehicle 4 and the following vehicle 5 behind the following vehicle 3 receive the clearing status field, they know that they will re-join the platoon later, so that before the temporary clearing timer T1 times out, the following vehicle 4 and following vehicle 5 save the platoon information of the target vehicle platoon and basically maintain the original formation, and the leading vehicle will not clear the platoon information of the following vehicle 4 and the following vehicle 5 behind the following vehicle 3 in the original target vehicle platoon. For example, a normal platoon joining process is complex, the leading vehicle needs to collect various information of each vehicle such as a color, a vehicle ID, a vehicle speed, and a position, and further needs to perform authentication and the like. When each vehicle re-joins the platoon in a temporary clearing status, because the information is still maintained, the platoon joining process may be simplified. For example, the following vehicle 4 and the following vehicle 5 behind the following vehicle 3 only need to transmit the vehicle ID, the vehicle speed, and the position information (which may be included in the platoon joining message) to the leading vehicle, for the leading vehicle to determine whether the following vehicle 4 and the following vehicle 5 behind the following vehicle 3 can re-join the platoon.

If the following vehicle 4 or/and the following vehicle 5 behind the following vehicle 3 do not transmit a platoon joining message before T1 times out, the leading vehicle will consider that the following vehicle 4 or/and the following vehicle 5 behind the following vehicle 3 do not intend to re-join the platoon, and determine that the following vehicle 4 or/and the following vehicle 5 behind the following vehicle 3 leave the platoon.

For example, if the following vehicle 3 has not completely left the target vehicle platoon when the time specified by the temporary clearing timer T1 is reached, the following vehicle 4 and the following vehicle 5 find that the following vehicle 3 is still in front of them after T1. In this case, the following vehicle 4 and the following vehicle 5 may leave the platoon, and re-issue a normal platoon joining application to the leading vehicle when the conditions are met.

Step S24: The leading vehicle returns a platoon information confirmation message to the following vehicle 4 and the following vehicle 5 behind the following vehicle 3.

The leading vehicle removes platoon information of a left vehicle (which is platoon information about the following vehicle 3 herein) from the memberlist, and transmits a PMM (leadingExt: the leavinglist is empty, and the memberlist does not include identity information of the left vehicle) message to the following vehicle 4 or/and the following vehicle 5 returning the platoon joining message as the platoon information confirmation message.

According to the method for controlling vehicles driving as a platoon provided in the implementations of this application, when any target in-platoon vehicle in a target vehicle platoon needs to leave the platoon, the target in-platoon vehicle may actively transmit a leaving application message to a leading vehicle, and the leading vehicle may trigger, in response to the leaving application message, following vehicles behind the target in-platoon vehicle to be temporarily cleared.

Figure 4:
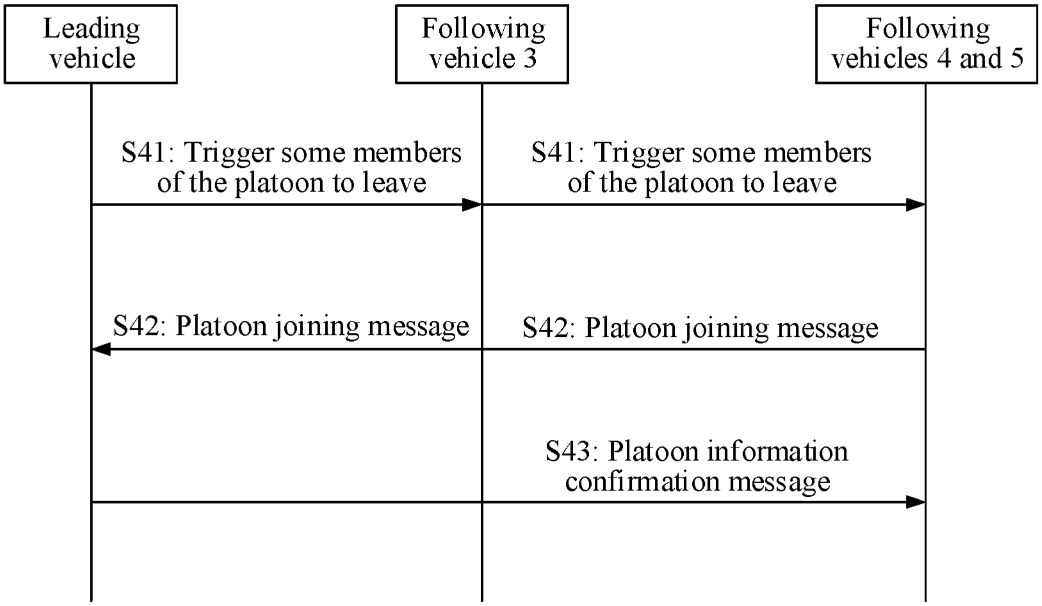
FIG. 4 is a schematic diagram of a method for controlling vehicles driving as a platoon according to still another embodiment of this application.

FIG. 4 is a schematic diagram of a method for controlling vehicles driving as a platoon according to still another embodiment of this application. As shown in FIG. 4, that a leading vehicle actively triggers a target in-platoon vehicle to leave the platoon may include the following steps: It is still assumed that a member list inside a target vehicle platoon is as follows: a leading vehicle, a following vehicle 1, a following vehicle 2, a following vehicle 3, a following vehicle 4, and a following vehicle 5, and it is assumed that following vehicle 3 is a target in-platoon vehicle that needs to leave the target vehicle platoon.

Step S41: The leading vehicle triggers the following vehicle 3 and some members, namely, the following vehicle 4 and the following vehicle 5 behind the following vehicle 3 to leave the platoon. The following vehicle 3 is put into the leaving list leavinglist.

Step S42: The following vehicle 4 and the following vehicle 5 behind the following vehicle 3 return a platoon joining message to the leading vehicle for a platoon re-joining application.

Step S43: The leading vehicle returns a platoon information confirmation message to the following vehicle 4 and the following vehicle 5 behind the following vehicle 3.

For a specific implementation process of step S41 to step S43, reference may be made to step S22 to step S24 in the embodiment in FIG. 2.

In the method for controlling vehicles driving as a platoon provided in the implementations of this application, when necessary, the leading vehicle may also actively clear the target in-platoon vehicle in the target vehicle platoon, and trigger temporary clearing of following vehicles behind the target in-platoon vehicle.

Figure 5:
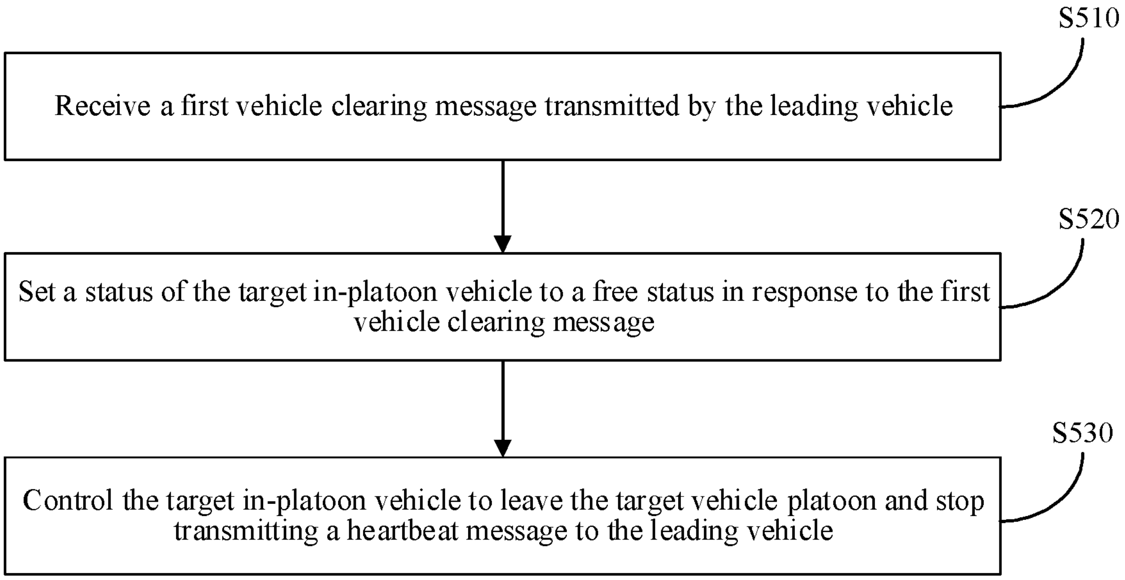
FIG. 5 is a schematic flowchart of a method for controlling vehicles driving as a platoon according to another embodiment of this application.

FIG. 5 is a schematic flowchart of a method for controlling vehicles driving as a platoon according to another embodiment of this application. A target vehicle platoon in the embodiment in FIG. 5 may include a leading vehicle and following vehicles, the following vehicles may include a tail vehicle and in-platoon vehicles, the in-platoon vehicles may include a target in-platoon vehicle about to leave the target vehicle platoon, and the method according to the embodiment in FIG. 5 is applicable to the target in-platoon vehicle.

As shown in FIG. 5, the method provided in this embodiment of this application may include the following steps:

Step S510: Receive a first vehicle clearing message transmitted by the leading vehicle.

In an exemplary embodiment, the first vehicle clearing message may not include the clearing status field; or the first vehicle clearing message may include the clearing status field, and the value of the clearing status field represents a non-temporary clearing indication; or the first vehicle clearing message may include the clearing status field, and the value of the clearing status field represents the temporary clearing indication.

In an exemplary embodiment, the first vehicle clearing message may include a leaving list and a temporary leaving list, the leaving list may include identity information of the target in-platoon vehicle, the temporary leaving list may include identity information of following vehicles behind the target in-platoon vehicle, and the temporary leaving list is used as a temporary clearing indication.

In an exemplary embodiment, before the receiving a first vehicle clearing message transmitted by the leading vehicle, the method may further include: transmitting a leaving application message to the leading vehicle, for the leading vehicle to return the first vehicle clearing message in response to the leaving application message.

Step S520: Set a status of the target in-platoon vehicle to a free status in response to the first vehicle clearing message.

Step S530: Control the target in-platoon vehicle to leave the target vehicle platoon and stop transmitting a heartbeat message to the leading vehicle.

For specific implementation of the embodiment in FIG. 5, reference may be made to the contents in the embodiments in FIG. 1 to FIG. 3.

Figure 6:
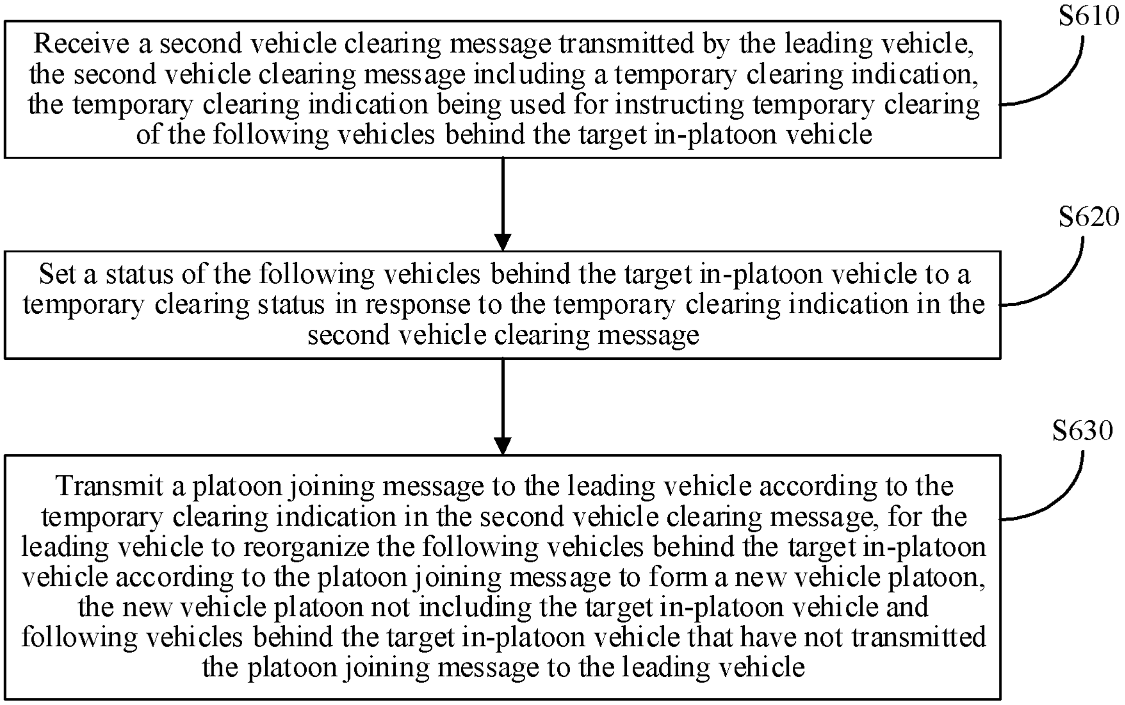
FIG. 6 is a schematic flowchart of a method for controlling vehicles driving as a platoon according to still another embodiment of this application.

FIG. 6 is a schematic flowchart of a method for controlling vehicles driving as a platoon according to still another embodiment of this application. A target vehicle platoon in the embodiment in FIG. 6 may include a leading vehicle and following vehicles, the following vehicles may include a tail vehicle and in-platoon vehicles, the in-platoon vehicles may include a target in-platoon vehicle about to leave the target vehicle platoon, and the method according to the embodiment in FIG. 6 is applicable to following vehicles behind the target in-platoon vehicle.

As shown in FIG. 6, the method provided in this embodiment of this application may include the following steps:

Step S610: Receive a second vehicle clearing message transmitted by the leading vehicle, the second vehicle clearing message including a temporary clearing indication, the temporary clearing indication being used for instructing temporary clearing of the following vehicles behind the target in-platoon vehicle.

In an exemplary embodiment, the second vehicle clearing message may include a leaving list and a temporary leaving list, the leaving list may include identity information of the target in-platoon vehicle, the temporary leaving list may include identity information of following vehicles behind the target in-platoon vehicle, and the temporary leaving list is used as a temporary clearing indication.

S620: Set a status of the following vehicles behind the target in-platoon vehicle to a temporary clearing status in response to the temporary clearing indication in the second vehicle clearing message.

In an exemplary embodiment, the method provided in this embodiment of this application may further include: when the following vehicles behind the target in-platoon vehicle are in the temporary clearing status, continuing to save platoon information of the target vehicle platoon in the following vehicles behind the target in-platoon vehicle.

Step S630: Transmit a platoon joining message to the leading vehicle according to the temporary clearing indication in the second vehicle clearing message, for the leading vehicle to reorganize the following vehicles behind the target in-platoon vehicle according to the platoon joining message to form a new vehicle platoon, the new vehicle platoon not including the target in-platoon vehicle and following vehicles behind the target in-platoon vehicle that have not transmitted the platoon joining message to the leading vehicle.

In an exemplary embodiment, the temporary clearing indication may include a temporary clearing timer. The method provided in this embodiment of this application may further include: setting, by a target following vehicle when the target following vehicle in the following vehicles behind the target in-platoon vehicle have not returned the platoon joining message to the leading vehicle within a time specified by the temporary clearing timer, a status of the target following vehicle to a free status.

Figure 7:
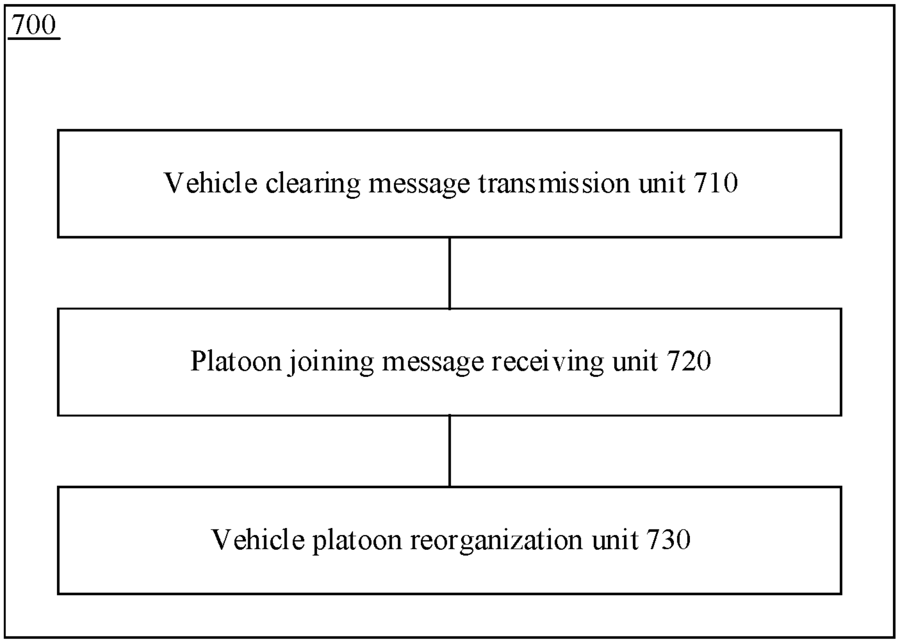
FIG. 7 is a schematic block diagram of an apparatus for controlling vehicles driving as a platoon according to an embodiment of this application.

FIG. 7 is a schematic block diagram of an apparatus for controlling vehicles driving as a platoon according to an embodiment of this application. In the embodiment in FIG. 7, a target vehicle platoon may include a leading vehicle and following vehicles, the following vehicles may include a tail vehicle and in-platoon vehicles, the in-platoon vehicles may include a target in-platoon vehicle about to leave the target vehicle platoon, and the apparatus for controlling vehicles driving as a platoon 700 is applicable to the leading vehicle.

The apparatus for controlling vehicles driving as a platoon 700 provided in the embodiment in FIG. 7 may include a vehicle clearing message transmission unit 710, a platoon joining message receiving unit 720, and a vehicle platoon reorganization unit 730.

The vehicle clearing message transmission unit 710 may be configured to: transmit a first vehicle clearing message to the target in-platoon vehicle, and transmit a second vehicle clearing message to following vehicles behind the target in-platoon vehicle, the first vehicle clearing message being used for indicating that a status of the target in-platoon vehicle is a free status and instructing the target in-platoon vehicle to leave the target vehicle platoon, the second vehicle clearing message including a temporary clearing indication, the temporary clearing indication being used for instructing temporary clearing of the following vehicles behind the target in-platoon vehicle, and a status of the following vehicles behind the target in-platoon vehicle that receive the second vehicle clearing message being a temporary clearing status; the platoon joining message receiving unit 720 may be configured to receive a platoon joining message returned, in response to the temporary clearing indication, from the following vehicles behind the target in-platoon vehicle; and the vehicle platoon reorganization unit 730 may be configured to reorganize the following vehicles behind the target in-platoon vehicle according to the platoon joining message to form a new vehicle platoon, the new vehicle platoon not including the target in-platoon vehicle and following vehicles behind the target in-platoon vehicle that have not transmitted the platoon joining message to the leading vehicle.

In an exemplary embodiment, the second vehicle clearing message may include a clearing status field, and a value of the clearing status field represents the temporary clearing indication, where the first vehicle clearing message may not include the clearing status field; or the first vehicle clearing message may include the clearing status field, and the value of the clearing status field represents a non-temporary clearing indication; or the first vehicle clearing message may include the clearing status field, and the value of the clearing status field represents the temporary clearing indication.

In an exemplary embodiment, the first vehicle clearing message and the second vehicle clearing message may include a leaving list and a temporary leaving list, the leaving list may include identity information of the target in-platoon vehicle, the temporary leaving list may include identity information of the following vehicles behind the target in-platoon vehicle, and the temporary leaving list is used as the temporary clearing indication.

In an exemplary embodiment, the apparatus for controlling vehicles driving as a platoon 700 may further include: a leaving application message receiving unit, which may be configured to: before the transmitting a first vehicle clearing message to the target in-platoon vehicle, and transmitting a second vehicle clearing message to following vehicles behind the target in-platoon vehicle, receive a leaving application message transmitted by the target in-platoon vehicle. The vehicle clearing message transmission unit 710 may include: a platoon temporary clearing message transmission unit, which may be configured to: in response to the leaving application message, transmit the first vehicle clearing message to the target in-platoon vehicle, and transmitting the second vehicle clearing message to the following vehicles behind the target in-platoon vehicle.

In an exemplary embodiment, the leaving application message may carry the identity information of the target in-platoon vehicle. The platoon temporary clearing message transmission unit may include: a current platoon information acquisition unit, which may be configured to acquire platoon information of the target vehicle platoon according to the identity information of the target in-platoon vehicle carried in the leaving application message; and a non-tail vehicle determining unit, which may be configured to: when it is determined according to the platoon information of the target vehicle platoon that the target in-platoon vehicle is not the tail vehicle, transmit the first vehicle clearing message to the target in-platoon vehicle, and transmit the second vehicle clearing message to the following vehicles behind the target in-platoon vehicle. The apparatus for controlling vehicles driving as a platoon 700 may further include: a target in-platoon vehicle free status setting unit, which may be configured to: after the in response to the leaving application message, transmitting the first vehicle clearing message to the target in-platoon vehicle, and transmitting the second vehicle clearing message to the following vehicles behind the target in-platoon vehicle, put the identity information of the target in-platoon vehicle into a leaving list, for the status of the target in-platoon vehicle to be set to the free status; and a temporary clearing status setting unit, which may be configured to set the status of the following vehicles behind the target in-platoon vehicle to the temporary clearing status.

In an exemplary embodiment, the vehicle clearing message transmission unit 710 may include: an active clearing target in-platoon vehicle unit, which may be configured to: when detecting an abnormal behavior of the target in-platoon vehicle or in response to an adjustment instruction for adjusting the target vehicle platoon, transmit the first vehicle clearing message to the target in-platoon vehicle, and transmit the second vehicle clearing message to the following vehicles behind the target in-platoon vehicle.

In an exemplary embodiment, the temporary clearing indication may include a temporary clearing timer. The apparatus for controlling vehicles driving as a platoon 700 may further include: a platoon information maintenance unit, which may be configured to: after the transmitting a second vehicle clearing message to following vehicles behind the target in-platoon vehicle, maintain, in the leading vehicle before a time specified by the temporary clearing timer, platoon information of the following vehicles behind the target in-platoon vehicle in the target vehicle platoon.

In an exemplary embodiment, the temporary clearing indication may include a temporary clearing timer. The apparatus for controlling vehicles driving as a platoon 700 may further include: a target following vehicle status transition unit, which may be configured to: when no platoon joining message returned by a target following vehicle in the following vehicles behind the target in-platoon vehicle has been received within a time specified by the temporary clearing timer, put identity information of the target following vehicle into a leaving list, and set a status of the target following vehicle to the free status.

In an exemplary embodiment, the vehicle platoon reorganization unit 730 may include: a platoon information organization unit, which may be configured to reorganize platoon information according to the platoon joining message; and a new vehicle platoon formation unit, which may be configured to: transmit the reorganized platoon information to the following vehicles behind the target in-platoon vehicle that have returned the platoon joining message, to form a new vehicle platoon, the new vehicle platoon not including the target in-platoon vehicle and following vehicles behind the target in-platoon vehicle that have not transmitted the platoon joining message to the leading vehicle.

In an exemplary embodiment, for specific implementation of the units in the apparatus for controlling vehicles driving as a platoon provided in this embodiment of this application, reference may be made to the contents in the foregoing method for controlling vehicles driving as a platoon. Details are not described herein again.

Figure 8:
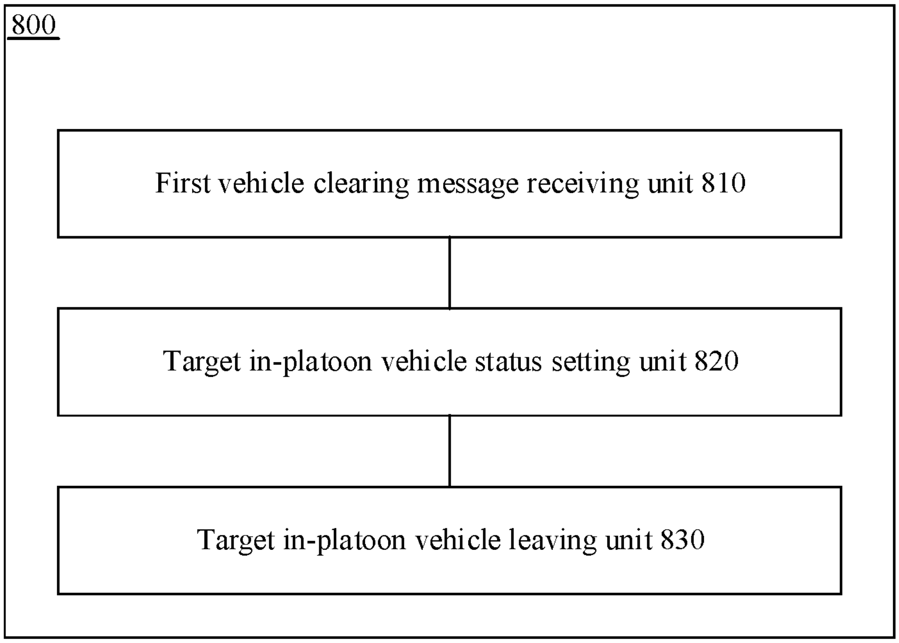
FIG. 8 is a schematic block diagram of an apparatus for controlling vehicles driving as a platoon according to another embodiment of this application.

FIG. 8 is a schematic block diagram of an apparatus for controlling vehicles driving as a platoon according to another embodiment of this application. In the embodiment in FIG. 8, a target vehicle platoon may include a leading vehicle and following vehicles, the following vehicles may include a tail vehicle and in-platoon vehicles, the in-platoon vehicles may include a target in-platoon vehicle about to leave the target vehicle platoon, and the apparatus for controlling vehicles driving as a platoon 800 is applicable to the target in-platoon vehicle.

As shown in FIG. 8, the apparatus for controlling vehicles driving as a platoon 800 provided in this embodiment of this application may include a first vehicle clearing message receiving unit 810, a target in-platoon vehicle status setting unit 820, and a target in-platoon vehicle leaving unit 830.

In this embodiment of this application, the first vehicle clearing message receiving unit 810 may be configured to receive a first vehicle clearing message transmitted by the leading vehicle. The target in-platoon vehicle status setting unit 820 may be configured to set a status of the target in-platoon vehicle to a free status in response to the first vehicle clearing message. The target in-platoon vehicle leaving unit 830 may be configured to control the target in-platoon vehicle to leave the target vehicle platoon and stop transmitting a heartbeat message to the leading vehicle.

In an exemplary embodiment, the first vehicle clearing message may not include the clearing status field; or the first vehicle clearing message may include the clearing status field, and the value of the clearing status field represents a non-temporary clearing indication; or the first vehicle clearing message may include the clearing status field, and the value of the clearing status field represents the temporary clearing indication.

In an exemplary embodiment, the first vehicle clearing message may include a leaving list and a temporary leaving list, the leaving list may include identity information of the target in-platoon vehicle, the temporary leaving list may include identity information of following vehicles behind the target in-platoon vehicle, and the temporary leaving list is used as a temporary clearing indication.

In an exemplary embodiment, the first vehicle clearing message receiving unit 810 may include: a leaving application message transmission unit, which may be configured to: before the receiving a first vehicle clearing message transmitted by the leading vehicle, transmit a leaving application message to the leading vehicle, for the leading vehicle to return the first vehicle clearing message in response to the leaving application message.

In an exemplary embodiment, for specific implementation of the units in the apparatus for controlling vehicles driving as a platoon provided in this embodiment of this application, reference may be made to the contents in the foregoing method for controlling vehicles driving as a platoon. Details are not described herein again.

Figure 9:
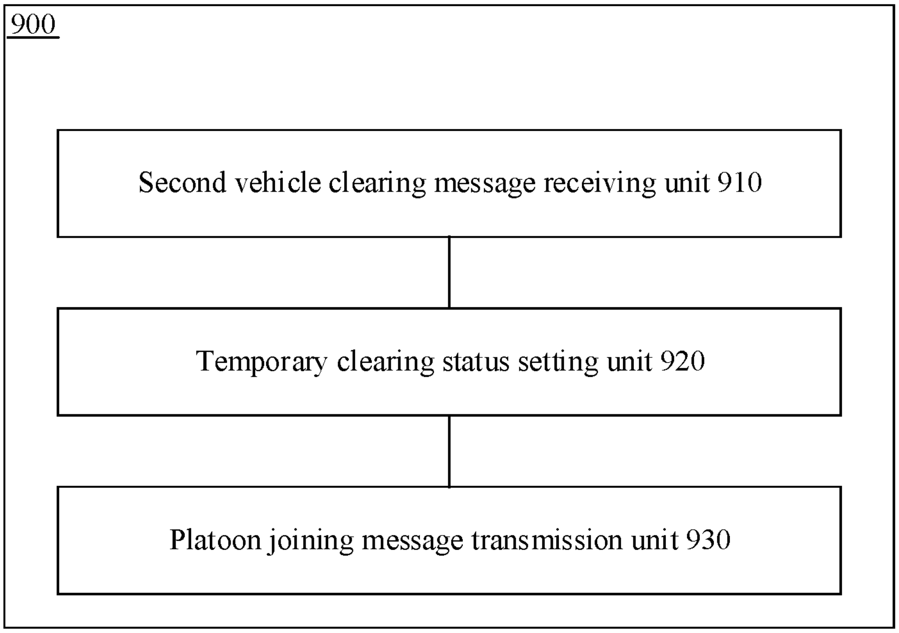
FIG. 9 is a schematic block diagram of an apparatus for controlling vehicles driving as a platoon according to still another embodiment of this application.

FIG. 9 is a schematic block diagram of an apparatus for controlling vehicles driving as a platoon according to still another embodiment of this application. In the embodiment in FIG. 9, a target vehicle platoon may include a leading vehicle and following vehicles, the following vehicles may include a tail vehicle and in-platoon vehicles, the in-platoon vehicles may include a target in-platoon vehicle about to leave the target vehicle platoon, and the apparatus is applicable to following vehicles behind the target in-platoon vehicle.

As shown in FIG. 9, the apparatus for controlling vehicles driving as a platoon 900 provided in this embodiment of this application may include a second vehicle clearing message receiving unit 910, a temporary clearing status setting unit 920, and a platoon joining message transmission unit 930.

In this embodiment of this application, the second vehicle clearing message receiving unit 910 may be configured to receive a second vehicle clearing message transmitted by the leading vehicle, the second vehicle clearing message including a temporary clearing indication, the temporary clearing indication being used for instructing temporary clearing of the following vehicles behind the target in-platoon vehicle. The temporary clearing status setting unit 920 may be configured to set a status of the following vehicles behind the target in-platoon vehicle to a temporary clearing status in response to the temporary clearing indication in the second vehicle clearing message. The platoon joining message transmission unit 930 may be configured to transmit a platoon joining message to the leading vehicle according to the temporary clearing indication in the second vehicle clearing message, for the leading vehicle to reorganize the following vehicles behind the target in-platoon vehicle according to the platoon joining message to form a new vehicle platoon, the new vehicle platoon not including the target in-platoon vehicle and following vehicles behind the target in-platoon vehicle that have not transmitted the platoon joining message to the leading vehicle.

In an exemplary embodiment, the second vehicle clearing message may include a leaving list and a temporary leaving list, the leaving list may include identity information of the target in-platoon vehicle, the temporary leaving list may include identity information of the following vehicles behind the target in-platoon vehicle, and the temporary leaving list is used as the temporary clearing indication.

In an exemplary embodiment, the apparatus for controlling vehicles driving as a platoon 900 may further include: a current platoon information continue-to-save unit, which may be configured to: when the following vehicles behind the target in-platoon vehicle are in the temporary clearing status, continue to save platoon information of the target vehicle platoon in the following vehicles behind the target in-platoon vehicle.

In an exemplary embodiment, the temporary clearing indication may include a temporary clearing timer. The apparatus for controlling vehicles driving as a platoon 900 may further include: a target following vehicle status setting unit, which may be configured to set, when a target following vehicle in the following vehicles behind the target in-platoon vehicle have not returned the platoon joining message to the leading vehicle within a time specified by the temporary clearing timer, a status of the target following vehicle to a free status.

In an exemplary embodiment, for specific implementation of the units in the apparatus for controlling vehicles driving as a platoon provided in this embodiment of this application, reference may be made to the contents in the foregoing method for controlling vehicles driving as a platoon. Details are not described herein again.

Figure 10:
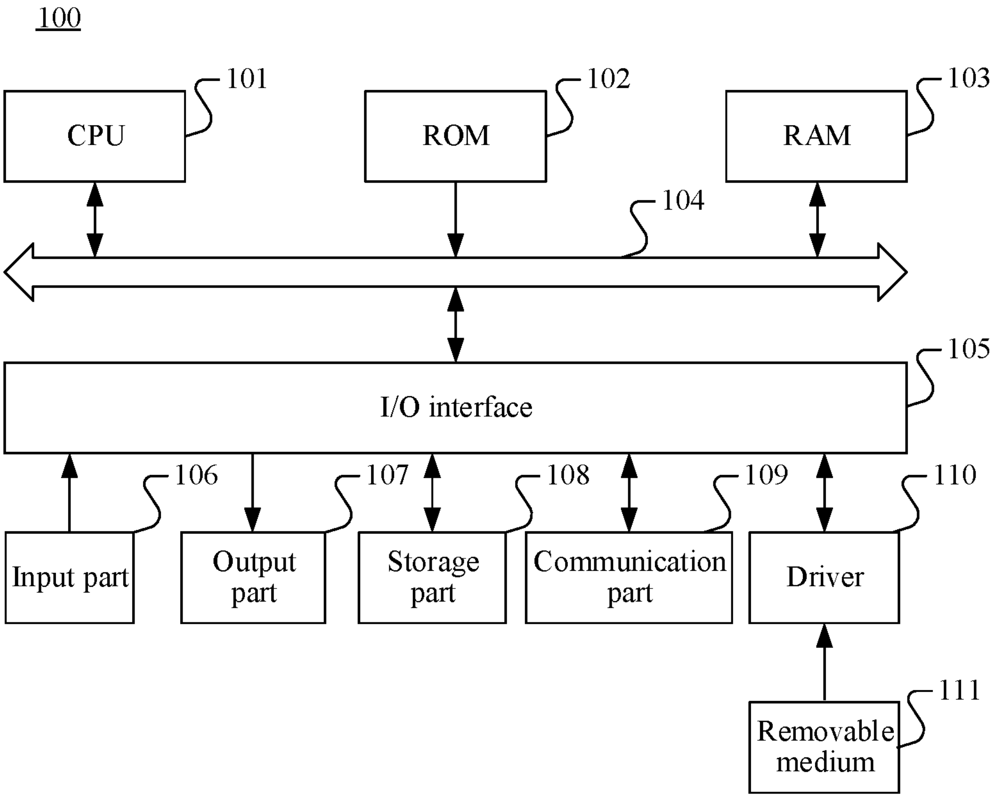
FIG. 10 is a schematic structural diagram of an electronic device adapted to implement embodiments of this application.

FIG. 10 is a schematic structural diagram of an electronic device adapted to implement embodiments of this application.

An electronic device 100 shown in FIG. 10 is merely an example, and does not constitute any limitation on functions and use ranges of the embodiments of this application.

As shown in FIG. 10, the electronic device 100 includes a central processing unit (CPU) 101, which may perform various appropriate actions and processing according to a program stored in a read-only memory (ROM) 102 or a program loaded from a storage portion 108 into a random access memory (RAM) 103. The RAM 103 further stores various programs and data required for system operations. The CPU 101, the ROM 102, and the RAM 103 are connected to each other through a bus 104. An input/output (I/O) interface 105 is also connected to the bus 104.

The following components are connected to the I/O interface 105: an input part 106 including a keyboard, a mouse, or the like, an output part 107 including a cathode ray tube (CRT), a liquid crystal display (LCD), a speaker, or the like, a storage part 108 including a hard disk, or the like, and a communication part 109 including a network interface card such as a local area network (LAN) card or a modem. The communication part 109 performs communication processing by using a network such as the Internet. A driver 110 is also connected to the I/O interface 105 as required. A removable medium 111, such as a magnetic disk, an optical disc, a magneto-optical disk, or a semiconductor memory, is installed on the driver 110 as required, so that a computer program read from the removable medium is installed into the storage part 108 as required.

Particularly, according to an embodiment of this application, the processes described in the following by referring to the flowcharts may be implemented as computer software programs. For example, this embodiment of this application includes a computer program product, the computer program product includes a computer program carried on a computer-readable storage medium, and the computer program includes program code used for performing the methods shown in the flowcharts. In such an embodiment, the computer program may be downloaded and installed from a network through the communication part 109, and/or installed from the removable medium 111. When the computer program is executed by the CPU 101, various functions defined in the method and/or apparatus of this application are executed.

The computer-readable storage medium shown in this application may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination of the above.

According to another aspect, this application further provides a computer-readable storage medium. The computer-readable storage medium may be included in the electronic device described in the foregoing embodiments, or may exist alone and is not disposed in the electronic device. The computer-readable storage medium carries one or more programs, the one or more programs, when executed by the electronic device, causing the electronic device to implement the method described in the following embodiments. For example, the electronic device may implement the steps shown in FIG. 1 or FIG. 2 or FIG. 3 or FIG. 4 or FIG. 5.

The technical solutions of the implementations of this application may be implemented in a form of a software product. The software product may be stored in a non-volatile storage medium (which may be a CD-ROM, a USB flash drive, a removable hard disk, or the like) or on a network, including several instructions for instructing a computing device (which may be a personal computer, a server, a touch terminal, a network device, or the like) to perform the methods according to the implementations of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for controlling vehicles driving as a platoon performed by an electronic device in connection with a target vehicle platoon comprising a leading vehicle and following vehicles, the following vehicles comprising a tail vehicle and in-platoon vehicles, the in-platoon vehicles comprising a target in-platoon vehicle about to leave the target vehicle platoon, the method comprising:

transmitting, from the leading vehicle, a first vehicle clearing message to the target in-platoon vehicle, and a second vehicle clearing message to following vehicles in the target vehicle platoon behind the target in-platoon vehicle, the first vehicle clearing message being used for indicating that a status of the target in-platoon vehicle is a free status and instructing the target in-platoon vehicle to leave the target vehicle platoon, the second vehicle clearing message comprising a temporary clearing indication, the temporary clearing indication being used for instructing temporary clearing of the following vehicles behind the target in-platoon vehicle, and a status of the following vehicles behind the target in-platoon vehicle that receive the second vehicle clearing message being a temporary clearing status;

receiving a platoon joining message returned from the following vehicles behind the target in-platoon vehicle in response to receiving the temporary clearing indication; and reorganizing the following vehicles behind the target in-platoon vehicle according to the platoon joining message to form a new vehicle platoon, the new vehicle platoon not comprising the target in-platoon vehicle and following vehicles behind the target in-platoon vehicle that have not transmitted the platoon joining message to the leading vehicle.

2. The method according to claim 1, wherein the second vehicle clearing message comprises a clearing status field, and a value of the clearing status field represents the temporary clearing indication, wherein the first vehicle clearing message does not comprise the clearing status field; or the first vehicle clearing message comprises the clearing status field, and the value of the clearing status field represents a non-temporary clearing indication; or the first vehicle clearing message comprises the clearing status field, and the value of the clearing status field represents the temporary clearing indication.

3. The method according to claim 1, wherein the first vehicle clearing message and the second vehicle clearing message comprise a leaving list and a temporary leaving list, the leaving list comprising identity information of the target in-platoon vehicle, the temporary leaving list comprising identity information of the following vehicles behind the target in-platoon vehicle, and the temporary leaving list being used as the temporary clearing indication.

4. The method according to claim 1, wherein the method further comprises:

receiving a leaving application message transmitted by the target in-platoon vehicle; and the transmitting, from the leading vehicle, a first vehicle clearing message to the target in-platoon vehicle, and a second vehicle clearing message to following vehicles behind the target in-platoon vehicle comprises:

in response to receiving the leaving application message, transmitting, by the leading vehicle, the first vehicle clearing message to the target in-platoon vehicle, and the second vehicle clearing message to the following vehicles behind the target in-platoon vehicle.

5. The method according to claim 1, wherein the transmitting, from the leading vehicle, a first vehicle clearing message to the target in-platoon vehicle, and a second vehicle clearing message to following vehicles behind the target in-platoon vehicle comprises:

when detecting an abnormal behavior of the target in-platoon vehicle or in response to an adjustment instruction for adjusting the target vehicle platoon, transmitting the first vehicle clearing message to the target in-platoon vehicle, and transmitting the second vehicle clearing message to the following vehicles behind the target in-platoon vehicle.

6. The method according to claim 1, wherein the temporary clearing indication comprises a temporary clearing timer; and after the transmitting a second vehicle clearing message to following vehicles behind the target in-platoon vehicle, the method further comprises:

maintaining, in the leading vehicle before a time specified by the temporary clearing timer, platoon information of the following vehicles behind the target in-platoon vehicle in the target vehicle platoon.

7. The method according to claim 1, wherein the temporary clearing indication comprises a temporary clearing timer; and the method further comprises:

when no platoon joining message returned by a target following vehicle in the following vehicles behind the target in-platoon vehicle has been received within a time specified by the temporary clearing timer, putting identity information of the target following vehicle into a leaving list, and setting a status of the target following vehicle to the free status.

8. The method according to claim 1, wherein the reorganizing the following vehicles behind the target in-platoon vehicle according to the platoon joining message to form a new vehicle platoon comprises:

reorganizing platoon information according to the platoon joining message; and transmitting the reorganized platoon information to the following vehicles behind the target in-platoon vehicle that have returned the platoon joining message, to form the new vehicle platoon.

9. An electronic device in connection with a current vehicle platoon including a leading vehicle and following vehicles, the following vehicles comprising a target following vehicle about to drive away from the current vehicle platoon, the target following vehicle being a non-tail vehicle in the current vehicle platoon, the electronic device comprising:

one or more processors; and a storage apparatus, configured to store one or more programs, the one or more programs, when executed by the one or more processors, causing the electronic device to implement a method for controlling vehicles driving as a platoon, the method including:

transmitting, from the leading vehicle, a first vehicle clearing message to the target in-platoon vehicle, and a second vehicle clearing message to following vehicles in the target vehicle platoon behind the target in-platoon vehicle, the first vehicle clearing message being used for indicating that a status of the target in-platoon vehicle is a free status and instructing the target in-platoon vehicle to leave the target vehicle platoon, the second vehicle clearing message comprising a temporary clearing indication, the temporary clearing indication being used for instructing temporary clearing of the following vehicles behind the target in-platoon vehicle, and a status of the following vehicles behind the target in-platoon vehicle that receive the second vehicle clearing message being a temporary clearing status;

receiving a platoon joining message returned from the following vehicles behind the target in-platoon vehicle in response to receiving the temporary clearing indication; and reorganizing the following vehicles behind the target in-platoon vehicle according to the platoon joining message to form a new vehicle platoon, the new vehicle platoon not comprising the target in-platoon vehicle and following vehicles behind the target in-platoon vehicle that have not transmitted the platoon joining message to the leading vehicle.

10. The electronic device according to claim 9, wherein the second vehicle clearing message comprises a clearing status field, and a value of the clearing status field represents the temporary clearing indication, wherein the first vehicle clearing message does not comprise the clearing status field; or the first vehicle clearing message comprises the clearing status field, and the value of the clearing status field represents a non-temporary clearing indication; or the first vehicle clearing message comprises the clearing status field, and the value of the clearing status field represents the temporary clearing indication.

11. The electronic device according to claim 9, wherein the first vehicle clearing message and the second vehicle clearing message comprise a leaving list and a temporary leaving list, the leaving list comprising identity information of the target in-platoon vehicle, the temporary leaving list comprising identity information of the following vehicles behind the target in-platoon vehicle, and the temporary leaving list being used as the temporary clearing indication.

12. The electronic device according to claim 9, wherein the method further comprises:

receiving a leaving application message transmitted by the target in-platoon vehicle; and the transmitting, from the leading vehicle, a first vehicle clearing message to the target in-platoon vehicle, and a second vehicle clearing message to following vehicles behind the target in-platoon vehicle comprises:

in response to receiving the leaving application message, transmitting, by the leading vehicle, the first vehicle clearing message to the target in-platoon vehicle, and the second vehicle clearing message to the following vehicles behind the target in-platoon vehicle.

13. The electronic device according to claim 9, wherein the transmitting, from the leading vehicle, a first vehicle clearing message to the target in-platoon vehicle, and a second vehicle clearing message to following vehicles behind the target in-platoon vehicle comprises:

when detecting an abnormal behavior of the target in-platoon vehicle or in response to an adjustment instruction for adjusting the target vehicle platoon, transmitting the first vehicle clearing message to the target in-platoon vehicle, and transmitting the second vehicle clearing message to the following vehicles behind the target in-platoon vehicle.

14. The electronic device according to claim 9, wherein the temporary clearing indication comprises a temporary clearing timer; and after the transmitting a second vehicle clearing message to following vehicles behind the target in-platoon vehicle, the method further comprises:

maintaining, in the leading vehicle before a time specified by the temporary clearing timer, platoon information of the following vehicles behind the target in-platoon vehicle in the target vehicle platoon.

15. The electronic device according to claim 9, wherein the temporary clearing indication comprises a temporary clearing timer; and the method further comprises:

when no platoon joining message returned by a target following vehicle in the following vehicles behind the target in-platoon vehicle has been received within a time specified by the temporary clearing timer, putting identity information of the target following vehicle into a leaving list, and setting a status of the target following vehicle to the free status.

16. The electronic device according to claim 9, wherein the reorganizing the following vehicles behind the target in-platoon vehicle according to the platoon joining message to form a new vehicle platoon comprises:

reorganizing platoon information according to the platoon joining message; and transmitting the reorganized platoon information to the following vehicles behind the target in-platoon vehicle that have returned the platoon joining message, to form the new vehicle platoon.

17. A non-transitory computer-readable storage medium, storing one or more programs, the one or more programs, when executed by one or more processors of an electronic device, causing the electronic device to implement a method for controlling vehicles driving as a platoon, the method including:

transmitting, from the leading vehicle, a first vehicle clearing message to the target in-platoon vehicle, and a second vehicle clearing message to following vehicles in the target vehicle platoon behind the target in-platoon vehicle, the first vehicle clearing message being used for indicating that a status of the target in-platoon vehicle is a free status and instructing the target in-platoon vehicle to leave the target vehicle platoon, the second vehicle clearing message comprising a temporary clearing indication, the temporary clearing indication being used for instructing temporary clearing of the following vehicles behind the target in-platoon vehicle, and a status of the following vehicles behind the target in-platoon vehicle that receive the second vehicle clearing message being a temporary clearing status;

receiving a platoon joining message returned from the following vehicles behind the target in-platoon vehicle in response to receiving the temporary clearing indication; and reorganizing the following vehicles behind the target in-platoon vehicle according to the platoon joining message to form a new vehicle platoon, the new vehicle platoon not comprising the target in-platoon vehicle and following vehicles behind the target in-platoon vehicle that have not transmitted the platoon joining message to the leading vehicle.

18. The non-transitory computer-readable storage medium according to claim 17, wherein the method further comprises:

receiving a leaving application message transmitted by the target in-platoon vehicle; and the transmitting, from the leading vehicle, a first vehicle clearing message to the target in-platoon vehicle, and a second vehicle clearing message to following vehicles behind the target in-platoon vehicle comprises:

in response to receiving the leaving application message, transmitting, by the leading vehicle, the first vehicle clearing message to the target in-platoon vehicle, and the second vehicle clearing message to the following vehicles behind the target in-platoon vehicle.

19. The non-transitory computer-readable storage medium according to claim 17, wherein the transmitting, from the leading vehicle, a first vehicle clearing message to the target in-platoon vehicle, and a second vehicle clearing message to following vehicles behind the target in-platoon vehicle comprises:

when detecting an abnormal behavior of the target in-platoon vehicle or in response to an adjustment instruction for adjusting the target vehicle platoon, transmitting, from the leading vehicle, the first vehicle clearing message to the target in-platoon vehicle, and the second vehicle clearing message to the following vehicles behind the target in-platoon vehicle.

20. The non-transitory computer-readable storage medium according to claim 17, wherein the temporary clearing indication comprises a temporary clearing timer; and after the transmitting a second vehicle clearing message to following vehicles behind the target in-platoon vehicle, the method further comprises:

maintaining, in the leading vehicle before a time specified by the temporary clearing timer, platoon information of the following vehicles behind the target in-platoon vehicle in the target vehicle platoon.

* * * * *